(12) United States Patent
Schaible

(10) Patent No.: US 6,367,426 B1
(45) Date of Patent: Apr. 9, 2002

(54) PET TAG SILENCER

(76) Inventor: Scott E. Schaible, 642 Gaylord St., Denver, CO (US) 80206

( * ) Notice: Subject to any disclaimer, the term of this patent is extended or adjusted under 35 U.S.C. 154(b) by 0 days.

(21) Appl. No.: 09/661,981

(22) Filed: Sep. 14, 2000

Related U.S. Application Data
(60) Provisional application No. 60/154,121, filed on Sep. 15, 1999.

(51) Int. Cl.[7] .............................. A01K 27/00; G09F 3/20
(52) U.S. Cl. .............................................. 119/856; 40/6
(58) Field of Search .................. 119/856, 858, 119/860; 283/75, 80; D30/155; 40/1.5, 6, 27, 300, 303, 634, 642.02, 654.01, 661, 662

(56) References Cited

U.S. PATENT DOCUMENTS

| | | | | |
|---|---|---|---|---|
| 1,452,250 A | * | 4/1923 | Moore et al. ............... D30/155 |
| 2,540,718 A | * | 2/1951 | Duskin .............................. 40/6 |
| 3,429,065 A | * | 2/1969 | Long et al. .................... 40/662 |
| 3,585,743 A | | 6/1971 | Jeffers ........................... 40/21 |
| 3,782,017 A | * | 1/1974 | Graham ........................ 40/300 |
| 3,871,336 A | * | 3/1975 | Bergman .................... 119/858 |
| 4,137,660 A | | 2/1979 | Dettmann et al. ............. 40/303 |
| 4,178,879 A | | 12/1979 | Cunningham ................ 119/106 |
| 4,259,798 A | | 4/1981 | McConnell ..................... 40/10 |
| 4,530,175 A | | 7/1985 | Wellman ........................ 40/10 |
| 4,616,435 A | * | 10/1986 | Perfect .............................. 40/6 |
| 4,739,566 A | | 4/1988 | Smith .......................... 40/303 |
| 4,991,338 A | | 2/1991 | Jones ........................... 40/653 |
| 5,129,614 A | | 7/1992 | Kohl ........................... 248/309 |
| 5,233,942 A | | 8/1993 | Cooper et al. .............. 119/792 |
| 5,381,617 A | * | 1/1995 | Schwartztol et al. ............. 40/6 |
| 5,429,393 A | * | 7/1995 | Parlo ........................... 283/75 |
| 5,477,633 A | | 12/1995 | Leinberger ................... 40/661 |
| 5,497,733 A | | 3/1996 | Hull et al. ................... 119/793 |
| 5,676,093 A | | 10/1997 | Sporn .......................... 119/792 |
| 5,718,192 A | | 2/1998 | Sebastian .................... 119/795 |

* cited by examiner

Primary Examiner—Charles T. Jordan
Assistant Examiner—Elizabeth Shaw
(74) Attorney, Agent, or Firm—Sheridan Ross P.C.

(57) ABSTRACT

A pet tag silencer capable of enclosing pet tags without the necessity of removing a pet's collar or tags is constructed of non-rigid, weather-resistant material adaptable to be secured to conventional pet collars. Stretchable enclosures and/or self-attaching material means are used to enclose rigid metal and/or plastic pet tags so as to prevent such pet tags from undesired rattling, thus facilitating quiet enjoyment of pets at night, on walks or jogs through neighborhoods, on hunting occasions and at dog shows.

10 Claims, 4 Drawing Sheets

PET TAG SILENCER

RELATED APPLICATIONS

This application claims priority from U.S. Provisional Patent Application No. 60/154,121 filed on Sep. 15, 1999. The entire disclosure of the provisional application is considered to be part of the disclosure of the accompanying application and is hereby incorporated by reference.

FIELD OF THE INVENTION

The present invention is directed to a pet tag silencer, and more particularly, to an enclosure for at least one pet tag constructed of non-rigid material and adaptable to be secured to conventional pet collars.

BACKGROUND OF THE INVENTION

Pet owners are generally required by state and local statutes to have their pets licensed and vaccinated, further requiring the pet owner to provide identification tags on the pet. Conventional pet tags are typically made of metal and/or sometimes rigid plastic material which tend to rattle and jangle together and/or against metal components of a pet tag collar whenever the pet moves. The annoying rattling of pet tags generates an objectionable noise. Indeed, pet owners often complain that the rattling of their pet's tags, especially at night, interferes with pet owner's sleep. Moreover, the present inventor has discovered that the audible jangling of pet tags calls undesired attention to pet owners when taking walks or jogging through neighborhoods where other pets reside. The result if often a cacophony of dog howling which tends to create a chain reaction that resonates through an otherwise quite street. Such events interfere with the quality time between a pet owner and his/her pet. Moreover, by calling attention to particular pets and pet owners, especially if a pet is smaller than resident pets in the neighborhood, often leads to dangerous pet fights in which pets and pet owners may suffer significant physical or psychological harm.

In addition, at amateur and professional pet shows, identification and licensing tags are often removed to prevent undesired noises and unsightly display of numerous required pet tags. Similarly, hunters often are faced with the predicament of having to remove dog tags from their hunting dogs in order to eliminate undesired audible noises during hunting activities. Because tags on pets are typically required by law in most states and municipalities, and with the prospect of fines of $50.00 and more levied against owners violating such statutes and ordinances, the option of simply removing pet tags prior to engaging in a desired activity is fraught with undesired risks. Moreover, the removal of pet tags defeats the very purpose for such tags: namely, the identification of the pet owner and verification that the pet has had required vaccinations.

Others have appreciated the desirability of having pet tag holders. For example, McConnell, U.S. Pat. No. 4,259,798, discloses a tag holder with spring arms extending from a single base to hold tags together. As others have noted (e.g., Smith, U.S. Pat. No. 4,739,566), however, the McConnell tag holder suffers from various deficiencies, including the fact that McConnell's tag holder can still contact other metal parts of a pet collar to create objectionable noise due to the fact that it hangs from one or more metal loops connected to the collar. The spring arms used by McConnell also must be pried apart to insert and remove tags and the design of the McConnell device does not allow the versatility required to effectively hold various sizes, thicknesses and styles of tags commonly on the market.

The Smith pet tag holder also suffers from various deficiencies including the necessity of having at least some rigid or semi-rigid elements in the pet tag holder construction, the need to use a plier or screwdriver to insert or remove tags from the Smith pet tag holder, etc. Importantly, the Smith pet tag holder requires that the pet collar be removed so that the collar can be slid through a portion of the holder. This is problematic in that most commercially available existing pet collars do not permit the simple threading of a pet collar through a pet tag holder slot as envisioned by Smith. Indeed, most conventional pet collars feature quick release buckles sewn into both ends of such collars which simply do not permit the use of the Smith product. Still other prior inventors have disclosed pet tag holders which suffer from other various problems. For example, Jeffers, U.S. Pat. No. 3,585,743, discloses a holder for a license tag which requires the screw attachment of a flat rectangular plate directly to a collar enclosure which only permits a single tag to be displayed. Dettmann et al., U.S. Pat. No. 4,137,660, similarly discloses a transparent plastic pocket secured by a rivet to a collar which only permits one tag to be secured to a pet collar. Hull et al., U.S. Pat. No. 5,497,733, (FIG. 4) discloses a holding pouch having an open end and which is stitched onto a pet strap.

In view of the long felt, but unsolved need for an effective pet tag silencer, it would be desirable to have a product that could be used by pet owners, hunters and professional and amateur pet show participants which avoids the deficiencies of the prior art. Specifically, a weather-resistant pet tag silencer that contains no rigid or semi-rigid elements, that can accommodate a plurality of differently sized and configured tags, that incorporates reflective elements, and that can be installed easily and in a manner of seconds, without tools, on conventional pet collars, would be highly desirable.

SUMMARY OF THE INVENTION

The present invention is directed to a device and method for silencing pet tags when such tags are worn by pets. The present invention does not utilize molded sockets, screws or other rigid or semi-rigid materials which significantly differentiates it from prior art devices nor does it require tools for installation. Moreover, the present invention provides for the accommodation of a plurality of differently sized and configured pet tags, rather than just one or a few tags. Importantly, the present invention provides a device and method for silencing one or more tags from undesired rattling against other hard objects by providing a device that can be attached directly to the tags themselves, eliminating any need to remove a pet's collar or tags prior to installation. This aspect of the present invention makes it incredibly easy for a pet owner to attach the present pet tag silencer when desired, and to remove the silencer with ease and efficiency in other situations. In a preferred embodiment, the device of the present invention is manufactured using a flexible, weather-resistant stretchable material, such as Neoprene, in a manner that generally encircles and/or entraps one or more pet tags sought to be silenced. Attachment of the present device to pet tags does not require tools and does not rely upon any screws or similar attachment mechanisms. Instead, the present device, in a preferred embodiment, is provided with hook and loop structures (e.g., Velcro®) as a means for attaching the flexible components of the present device in a manner that secures the device to the pet tags.

In a further preferred embodiment of the preferred device, the material comprising the device is reflective in nature (such that the pet tag silencer can be visualized at night when light is reflected from the reflective material), thus providing additional safety for a pet and a pet owner when accompanying the pet. Such reflective material can be physically or chemically bonded directly to the product itself, or sewn or otherwise attached to the device.

In still other embodiments, at least a portion of the device is transparent to permit visualization of the contents of pet tags held within such device.

In one embodiment of the present invention, a soft pouch capable of holding a plurality of pet tags is provided which encompasses, holds and carries such tags in a manner that prevents any metallic or hard plastic rattling sound from occurring. In essence, the present invention has a stealth characteristic, rendering a pet otherwise inaudible to other animals, for example, when a pet accompanies its pet owner on a stroll and/or when a pet accompanies a hunter when hunting. Use of the present invention avoids the undesired and often unlawful practice of removing tags from a pet's collar (or removing the collar altogether) in order to achieve elimination of undesired jangling of pet tags. Given that veterinarians, professional dog trainers, breeders and law enforcement officials overwhelmingly advise that pets should always wear a collar with identifying and licensing material attached thereto, the present invention provides a simple and effective way in which to achieve the silencing of undesired pet tag rattling without the use of rigid or semi-rigid material and without the need to use tools to install such a holder/silencer.

The present invention also provides a device and method for protecting fine furniture from scratches and nicks caused by contact between a pet's tags dangling from their collars when such pets come into close proximity with such furniture. Moreover, the manner in which the present device encompasses and encloses a plurality of pet tags prevents such tags from wearing down due to physical contact between the tags, thus eliminating the need to purchase and/or acquire new licensing, registration and/or I.D. tags every year or two as is now typically required.

DETAILED DESCRIPTION OF THE PREFERRED EMBODIMENT

Figure 1:
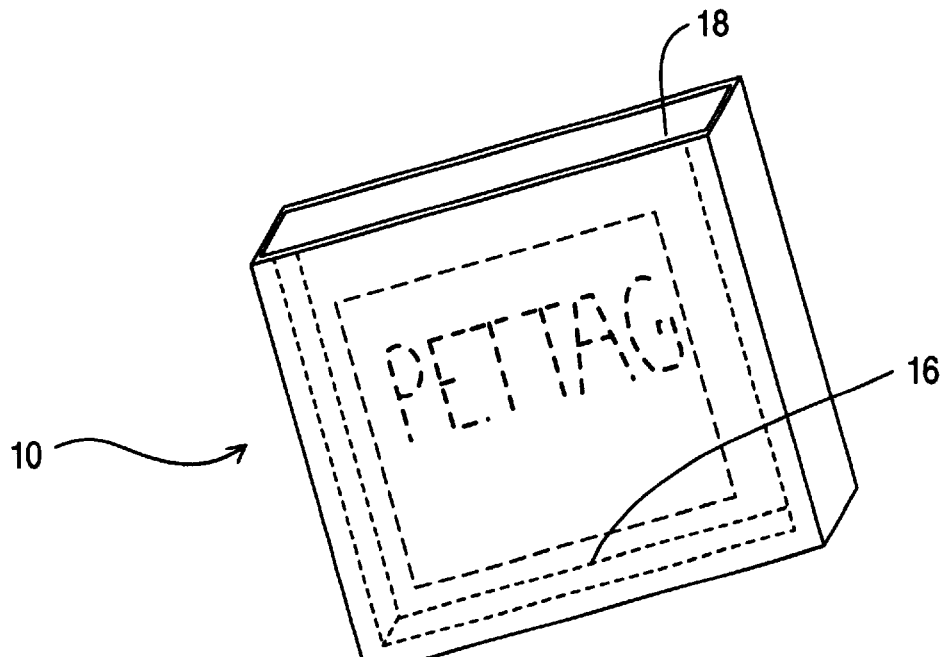
FIG. 1 is a perspective view of one embodiment of the present pet silencer invention.

In one embodiment of the present invention the pet tag silencer 10 is constructed of a flexible, stretchable material having at least one extended member 12 integral with the holder 10 and/or physically associated therewith by various attaching means including, but not limited to, stitching, snaps, rivets, glue, hook and loop structures, etc. Such extended member or members 12 can be of any length, but preferably are at least long enough to be flexibly stretched across the extent of the device 10 and then secured in place. In such a manner, pet tags 14 can be held securely in a pet tag receiving pocket or envelope 16. The edges of the pocket 16 may consist of folds of the material used to manufacture the device 10 or can be sewn, stapled, glued or otherwise attached using commonly known means. At least one side 18 of the pocket 16 remains opens so as to be accessible to one or more pet tags 14. While the dimensions of the opening 18 can be varied, the opening 18 is at least wide enough so that when the material comprising the device 10 is stretched, such opening 18 is large enough to accommodate insertion of one or more pet tags 14.

It will be appreciated that in particular embodiments of the present invention (see FIG. 1), no extending members are utilized to encircle the open end 18 of the device 10, but rather, the stretchable nature of the material acts to constrain pet tags 14 inserted in the pocket/envelope 16. In using such embodiment, a pet owner can grasp one or more pet tags 14 already dangling from a pet's collar and simply insert such pet tags 14 into an opening 18 of the present device 10, relying upon the stretchable nature of the material to constrict such tags 14 together and to enclose such tags 14 with the material, thus precluding any contact with other rigid surfaces.

Figure 2:
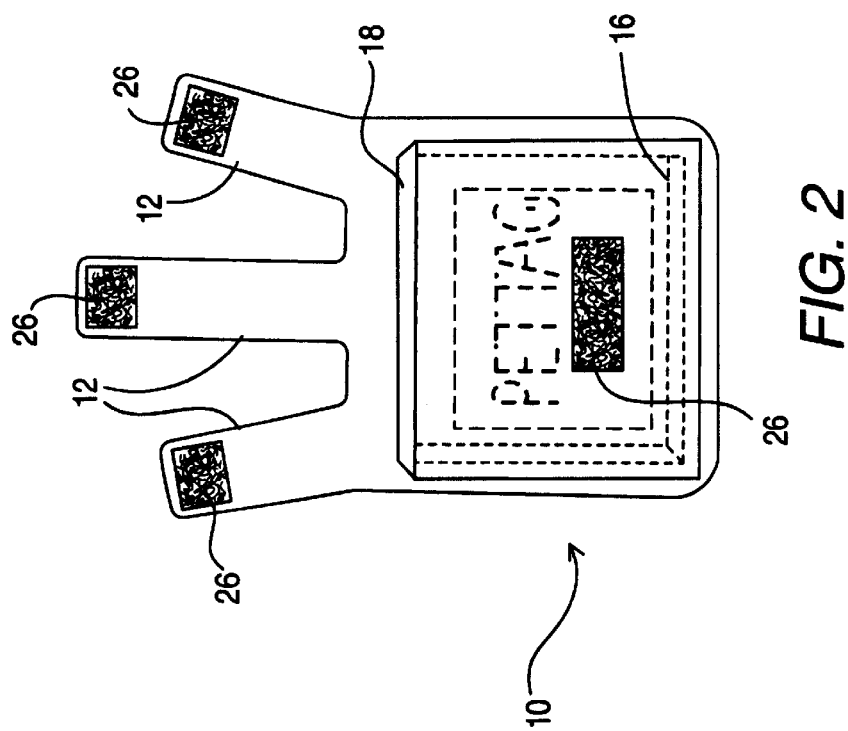
FIG. 2 is a perspective view of another embodiment of the present invention showing elongated members wrappable about the device to hold pet tags therein.

In still other embodiments (see FIG. 2), however, one or more extendible members 12 can be operatively associated with the envelope 16 and can be folded over the open end of the envelope 18, thus securing pet tags 14 therein. It will be appreciated that other closure means can be utilized other than an extendible member. For example, snaps, clips, interlocking corresponding structures (e.g., ziplock-like features) can be utilized to seal the interior space within the device from the exterior environment.

In yet another embodiment of the present invention, a reflective coating and/or material is applied to the exterior of the device 10. Various reflective materials are known and available and can either be chemically or physically bonded to the exterior of the envelope 16 or can be stitched, glued or otherwise attached to the exterior of the envelope 16, thus providing a reflective pet tag holder and silencer to render a pet more visible in darkness when illuminated by headlights of automobiles, flashlights, etc. Because the present device 10 provides for easy attachment and detachment with one or more pet tags 14, the reflective nature of the device 10 can be preserved by removing such device in the daytime hours, thus eliminating abrasive contact with the reflective surface.

As will be appreciated, various materials can be used to manufacture the present silencer device 10, preferably a stretchable fabric and/or material such as Neoprene. However, any type of flexible, preferably soft, material will be suitable as long as it achieves the purpose of encompassing pet tags so as not to permit them to jangle and/or rattle against other hard surfaces, including a pet's collar.

Figure 4:
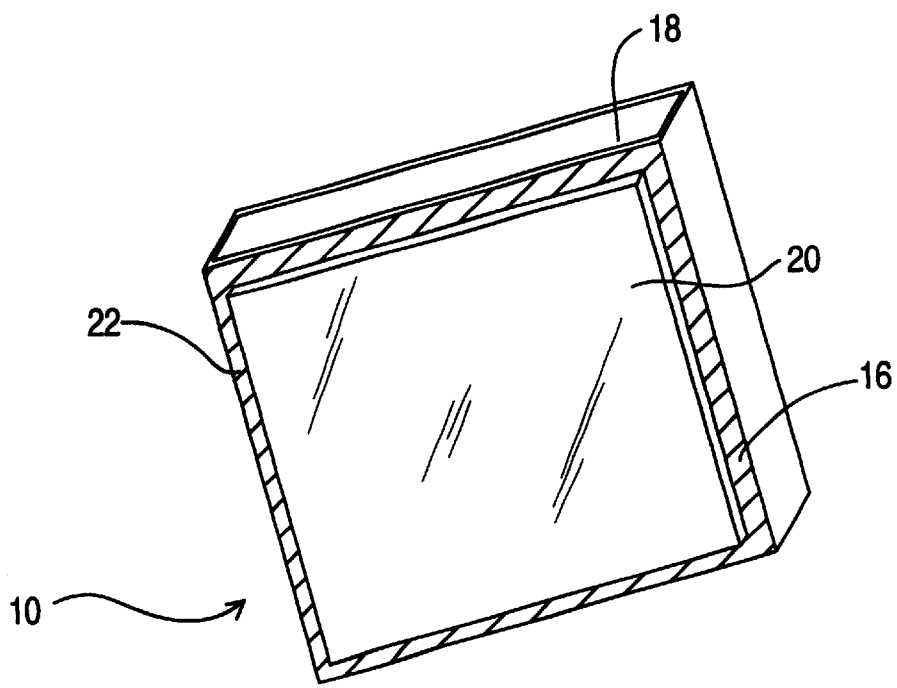
FIG. 4 is an illustration of one embodiment of the present invention having a transparent outer pocket attached thereto.

Still other embodiments of the present invention (see FIG. 4) include transparent windows 20 provided on the exterior of the envelope housing 16, either alone or in association with reflective materials. For example, a transparent window 20 formed by attaching the periphery of a transparent sheet directly to the exterior of the envelope 16 forms an additional pocket within which identification information can be inserted. Moreover, reflective material 22 can be applied to the perimeter of the transparent pocket 20, thus facilitating not only identification purposes through the visualization of inserted items within the transparent pocket 20, but also insuring the safety of the pet by providing a reflective component of the silencer device.

The material utilized to manufacture the silencer device of the present invention is preferably imprintable with ink or other types of marking elements such that trademarks, logos, pet names, owner names, etc., can be applied to the exterior of the envelope 16, further enhancing the ability of a lost pet to be rejoined with its rightful owner. For example, the exterior of an envelope 16 can be emblazoned with information concerning the contents of the envelope 16, namely, "enclosed are identification, registration and vaccination information".

Figure 3:
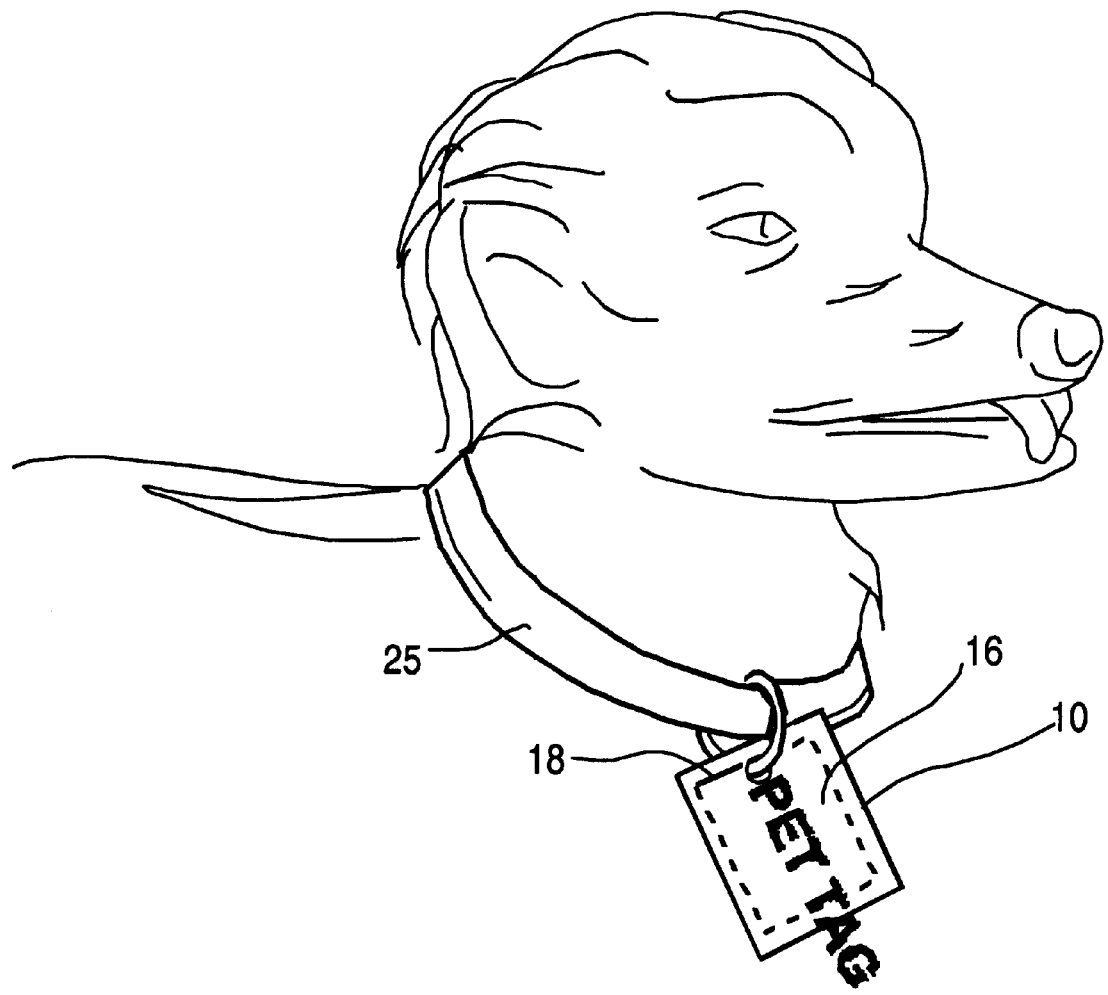
FIG. 3 is an illustration of the pet tag silencer of the present invention connected to pet tags around a pet's collar.

One of the unique features of the present invention is that it can be attached directly to existing pet tags 14 while the pet is wearing a pet collar 25 restraining such tags (see FIG. 3). Prior art pet tag holders often necessitate removal of the collar itself, as well as the individual pet tags in order to insert such pet tags into such devices. This time consuming and arduous task is eliminated by using the present device 10 which facilitates simple enclosure of pet tags 14 in a sound absorbing material by enclosing the pet tags 14 with the present tag pet silencer 10.

Figure 5:
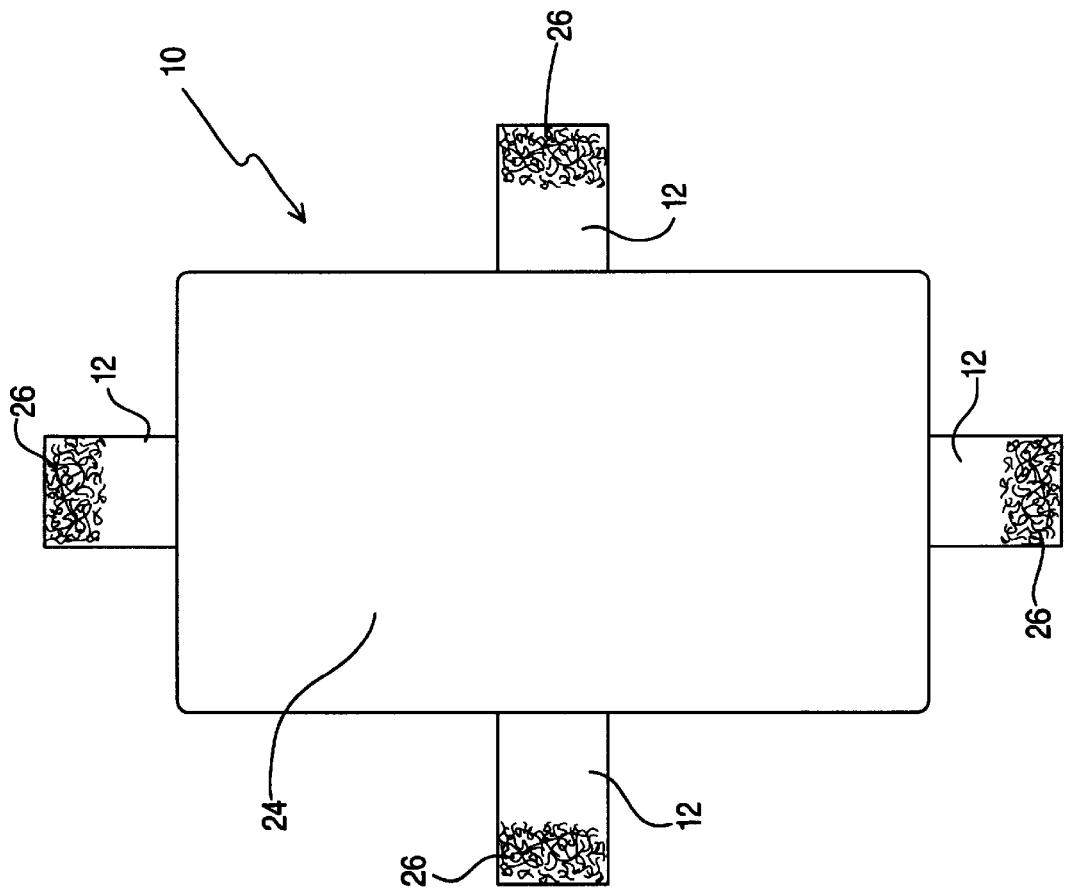
FIG. 5 is an illustration of one embodiment of the present invention wherein a substantially flat piece of material has a plurality of extending members with hook and loop structures to accommodate encirclement of pet tags.

It will further be appreciated that while the above preferred embodiment has disclosed the use of an envelope 16 with the device, other embodiments do not have a preformed envelope, but rather, the material of the silencer is wrapped about itself and secured to itself to form the enclosure (see FIG. 5). For example, a multi-fingered material with appropriate hook, loop or other attachments associated therewith can be formed from a single flat piece of material 24 and such material can then be folded around one or more pet tags. The extending members are locked in place using the hook and loop structures 26, or other means of attachment, thus providing an easy and efficient method and device for enclosing jangling pet tags.

Figure 6A:
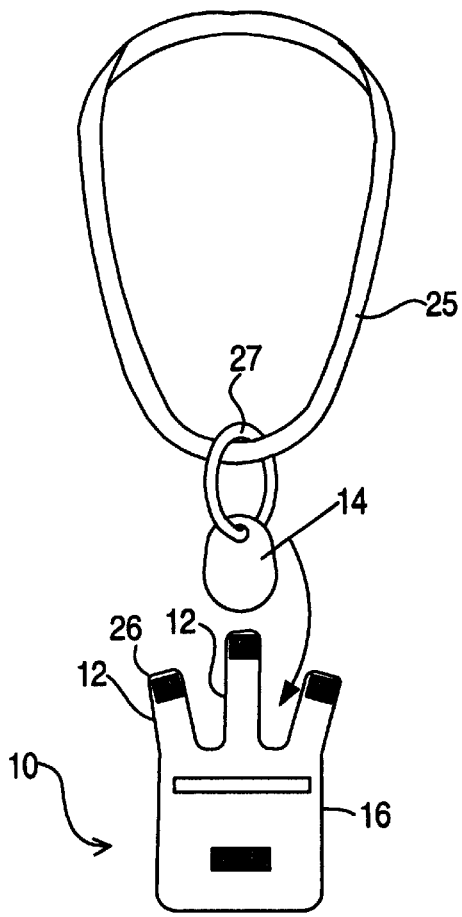
FIGS. 6A, B and C is an illustration of how the present invention is fitted onto a pet collar so as to encircle tags hanging therefrom.
Figure 6B:
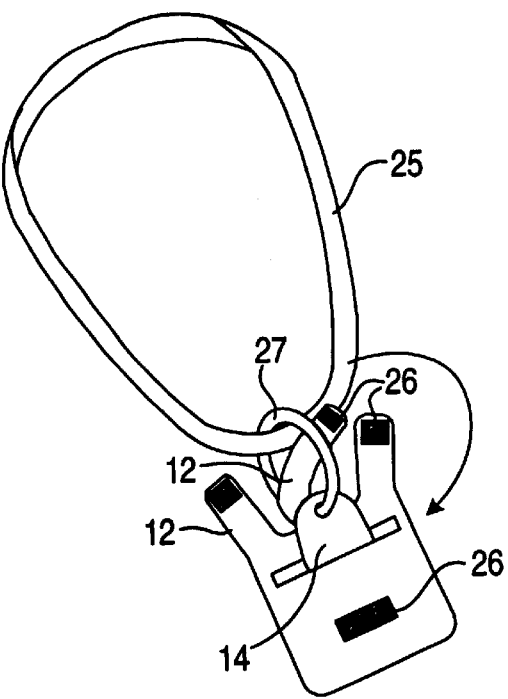
Figure 6C:
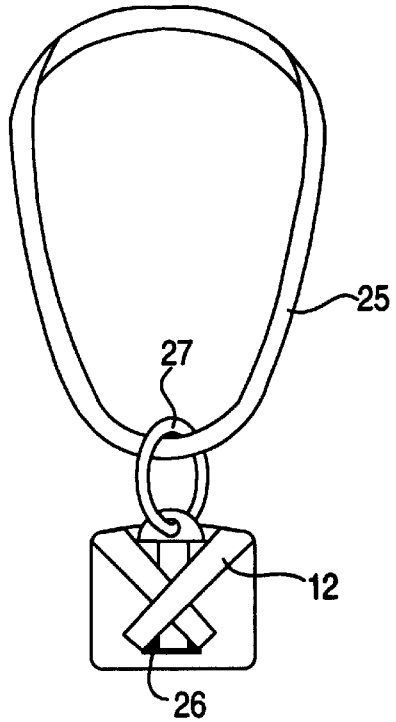

As shown in FIGS. 6A–6C, the device 10 of the present invention is easy to attach to an existing tag 14 hanging from a pet collar 25. A pet owner simply opens the three fingers 16 of the device 10 to release the hook/loop engagement between the fingers 12 and the body of the device 10. The tag 14 is then placed into the device 10 through the envelope 16 provided therein. Next, the owner threads the middle finger 12 through the pet collar 25 or a loop 27 hanging therefrom so as to connect the device 10 by encircling the finger 12 and reattaching the hook/loop fastening members 26. Finally, the remaining fingers 12 are crossed over the now enveloped tag 14 and secured with the hook/loop structure 26.

It will be appreciated that the device 10 of the present invention is preferably made of a washable material so that if it becomes heavily soiled, it can be removed and washed thoroughly. The present invention finds various uses, particularly in grooming of show pet animals given that the device 10 of the present invention keeps tags 14 from discoloring the coat of an animal which may otherwise occur without protective means for such tag 14. As discussed above, it finds particular application for light sleepers, households with sleeping babies, walkers and joggers, hunters and police and military animals. Other particular configurations and shapes, forms, closure means, etc. are anticipated by the present invention and are included herein within the scope of the invention, the illustrations and other descriptions of the invention merely describing particular embodiments thereof.

As an example of the various uses of the present invention, the device 10 keeps loose tags 14 from damaging the window tint on open automobile windows, given that dogs especially like to hang their heads out of moving vehicle windows. The device also keeps loose tags from clanging against the sensor in many "anti-bark" or "invisible" fence electronic collars. Thus, without the present invention, tags may hit such sensors and give the dog an unwarranted and often painful corrective signal. The device of the present invention further allows seeing-eye and other service dogs to do their jobs unmolested by dogs that may not be leashed and under control by a third party owner. As stated above, it is common knowledge that dogs are attracted to other dogs due in large part to the sound of jingling dog tags indicating the other dog's presence. The present invention also allows security and law enforcement dogs to remain silent and undetected while keeping their important identification and other tags intact on the animal. Finally, as mentioned above, the present invention keeps unslightly "tag varnish" from damaging the neck fur of white or light colored breeds, thus making the present invention useful and popular for groomers and grooming shops of animals.

While various embodiments of the present invention have been described in detail, it is apparent that further modifications and adaptations of the invention will occur to those skilled in the art. However, it is to be expressly understood that such modifications and adaptations are within the spirit and scope of the present invention.

What is claimed is:

1. A pet tag silencer comprising:
   a pet tag housing comprised of stretchable weather-resistant material and having at least one extension member wrappable around said housing to retain a pet tag therein, said extendible member being reversibly attachable to said housing, said housing having an opening to permit a plurality of pet tags, said housing being attachable to pet tags on a pet's collar without being connected to said collar, whereby when pet tags arc inserted into said housing and said at least one extendible member is wrapped around said housing, said pet tags are maintained such that said pet tags cannot make audible noise through contact with other pet tags or adjacent hard surfaces.

2. The pet tag silencer as set forth in claim 1, further comprising reflective components associated with said pet tag silencer.

3. A pet tag silencer comprising:
   a geometrically shaped piece of flexible material having means for self-attaching such material to other portions of such material, said material shaped and configured so as to accommodate the enclosure of at least one pet tag, whereby when said material is secured to itself around a pet tag, the pet tag is prevented from making audible noise when brought into contact with other pet tags or hard or rigid surfaces.

4. The pet tag silencer as set forth in claim 3, further comprising a reflective coating.

5. The pet tag silencer as set forth in claim 3, further comprising a transparent windowed enclosure physically associated with said silencer, said enclosure capable of accommodating the insertion of flat sheets of paper or plastic having information depicted thereon.

6. A pet tag silencer comprising:
   a pet tag housing having at least two extension members that are wrappable around said housing itself in a reversibly attachable manner, said housing having an opening to permit insertion of pet tags, and at least one of said extendible members being wrappable around said opening after insertion of a pet tag.

7. The pet tag silencer as set forth in claim 6, further comprising reflective components associated with said pet tag silencer.

8. The pet tag silencer of claim 6, wherein said silencer is made of material comprises neoprene.

9. The pet tag silencer of claim 6, wherein at least one of said members is provided with hook and loop structures to facilitate attachment of at least one of said members to said housing.

10. The pet tag silencer of claim 6, wherein said housing has at least three of said members, each having hook and loop structures associated therewith.

* * * * *